(12) United States Patent
Demuth et al.

(10) Patent No.: US 7,877,730 B2
(45) Date of Patent: Jan. 25, 2011

(54) METHOD FOR EFFECTING A PRELIMINARY SOFTWARE SERVICE IN A PRODUCTIVE SYSTEM OF A SOFTWARE SYSTEM LANDSCAPE AND COMPUTER SYSTEM

(75) Inventors: Michael Demuth, Rauenberg (DE); Volker Schulz, Heppenheim (DE); Herbert Stegmuller, Bruchsal (DE)

(73) Assignee: SAP AG, Walldorf (DE)

( * ) Notice: Subject to any disclaimer, the term of this patent is extended or adjusted under 35 U.S.C. 154(b) by 1298 days.

(21) Appl. No.: 11/262,043

(22) Filed: Oct. 27, 2005

(65) Prior Publication Data

US 2006/0123407 A1   Jun. 8, 2006

(30) Foreign Application Priority Data

Oct. 27, 2004  (EP) .................................. 04025507

(51) Int. Cl.
    *G06F 9/44* (2006.01)

(52) U.S. Cl. .................. 717/117; 717/107; 717/108; 717/116; 717/121; 717/124

(58) Field of Classification Search .................. None
    See application file for complete search history.

(56) References Cited

U.S. PATENT DOCUMENTS

| | | | |
|---|---|---|---|
| 5,237,688 | A | 8/1993 | Calvert et al. |
| 5,495,610 | A | 2/1996 | Shing et al. |
| 5,608,721 | A | 3/1997 | Natarajan et al. |
| 5,745,767 | A | 4/1998 | Rosen et al. |

(Continued)

FOREIGN PATENT DOCUMENTS

JP   2001265603   9/2001

(Continued)

OTHER PUBLICATIONS

"U.S. Appl. No. 11/261,816, Advisory Action mailed Jul. 28, 2009", 3 pgs.

(Continued)

*Primary Examiner*—Chuck O Kendall
(74) *Attorney, Agent, or Firm*—Schwegman, Lundberg & Woessner, P.A.

(57) ABSTRACT

A method for effecting a preliminary software service in at least one productive system of a plurality of logical systems of a software system landscape, wherein the logical systems are interconnected by logical transport paths and each logical system has associated therewith one of a plurality of system roles, the method comprises: providing system role types, each system role being associated to one of the system role types; providing an association of tasks to system role types; providing a transport track that defines a route for software services through logical systems in a particular order and specifies one source system in which software services are permitted, adjacent interconnected systems, and at least one target system; providing a preliminary software service relating to at least one of the code and the data of at least one productive system; and generating a hot fix instance from the preliminary software service, the system role types, the association and the transport tracks, the hot fix instance defining tasks for routing the preliminary software service to at least one productive system and for executing the preliminary software service therein.

11 Claims, 5 Drawing Sheets

U.S. PATENT DOCUMENTS

| | | | |
|---|---|---|---|
| 5,845,090 | A | 12/1998 | Collins, III et al. |
| 5,859,977 | A | 1/1999 | Nishiyama et al. |
| 5,860,007 | A | 1/1999 | Soni et al. |
| 5,953,533 | A | 9/1999 | Fink et al. |
| 6,110,228 | A | 8/2000 | Albright et al. |
| 6,263,358 | B1 | 7/2001 | Lee et al. |
| 6,308,173 | B1 | 10/2001 | Glasser et al. |
| 6,513,132 | B1 | 1/2003 | Suzuki |
| 7,020,690 | B1 | 3/2006 | Haitsuka et al. |
| 7,107,331 | B2 | 9/2006 | Gava et al. |
| 7,721,257 | B2 | 5/2010 | Demuth et al. |
| 7,725,891 | B2 | 5/2010 | Demuth et al. |
| 2001/0052074 | A1 | 12/2001 | Pensak et al. |
| 2002/0026592 | A1 | 2/2002 | Gavrila et al. |
| 2002/0103851 | A1 | 8/2002 | Kikinis |
| 2002/0129356 | A1* | 9/2002 | Hellerstein et al. .......... 717/177 |
| 2002/0156798 | A1 | 10/2002 | Larue et al. |
| 2002/0169878 | A1 | 11/2002 | Orenshteyn |
| 2002/0174164 | A1 | 11/2002 | Hayashi |
| 2002/0184398 | A1 | 12/2002 | Orenshteyn |
| 2002/0198725 | A1 | 12/2002 | Piepenbrink et al. |
| 2003/0040974 | A1 | 2/2003 | Chauvin et al. |
| 2003/0084350 | A1 | 5/2003 | Eibach et al. |
| 2003/0093516 | A1 | 5/2003 | Parsons et al. |
| 2003/0142627 | A1 | 7/2003 | Chiu et al. |
| 2004/0010708 | A1 | 1/2004 | Johnson et al. |
| 2004/0060044 | A1 | 3/2004 | Das et al. |
| 2004/0081183 | A1 | 4/2004 | Monza et al. |
| 2004/0117795 | A1 | 6/2004 | Wang et al. |
| 2004/0143811 | A1 | 7/2004 | Kaelicke et al. |
| 2004/0267935 | A1 | 12/2004 | Patiejunas |
| 2005/0080888 | A1 | 4/2005 | Walter |
| 2005/0209732 | A1 | 9/2005 | Audimoolam et al. |
| 2005/0210501 | A1 | 9/2005 | Zigmond et al. |
| 2006/0112189 | A1 | 5/2006 | Demuth et al. |
| 2006/0117311 | A1* | 6/2006 | Demuth et al. .............. 717/168 |
| 2006/0123392 | A1 | 6/2006 | Demuth et al. |
| 2006/0143614 | A1* | 6/2006 | Lier et al. ................... 718/100 |
| 2006/0149813 | A1 | 7/2006 | Janik |
| 2006/0155832 | A1 | 7/2006 | Demuth et al. |
| 2006/0164257 | A1 | 7/2006 | Giubbini |
| 2006/0203812 | A1* | 9/2006 | Demuth et al. .............. 370/360 |
| 2007/0038610 | A1 | 2/2007 | Omoigui |
| 2008/0183840 | A1 | 7/2008 | Khedouri et al. |

FOREIGN PATENT DOCUMENTS

| | | |
|---|---|---|
| WO | WO 01/63482 | 8/2001 |
| WO | WO-03060718 A1 | 7/2003 |

OTHER PUBLICATIONS

"U.S. Appl. No. 11/261,816, Final Office Action mailed May 14, 2009", 11 pgs.

"U.S. Appl. No. 11/261,816, Non-Final Office Action mailed Dec. 30, 2008", 14 pgs.

"U.S. Appl. No. 11/261,816, Notice of Allowance mailed Sep. 28, 2009", 11 Pgs.

"U.S. Appl. No. 11/261,816, Response filed Mar. 18, 2009 to Non-Final Office Action mailed Dec. 30, 2008", 15 pgs.

"U.S. Appl. No. 11/261,816, Response filed Aug. 11, 2009 to Advisory Action mailed Jul. 28, 2009", 11 pgs.

"U.S. Appl. No. 11/261,816, Response filed Jul. 10, 2009 to Final Office Action mailed May 14, 2009", 12 pgs.

"U.S. Appl. No. 11/262,143, Non-Final Office Action mailed Oct. 8, 2009", 11 pgs.

"U.S. Appl. No. 11/262,343, Advisory Action mailed Jun. 30, 2009", 5 pgs.

"U.S. Appl. No. 11/262,343, Final Office Action mailed Apr. 27, 2009", 11 pgs.

"U.S. Appl. No. 11/262,343, Non-Final Office Action mailed Sep. 14, 2009", 16 Pgs.

"U.S. Appl. No. 11/262,343, Non-Final Office Action mailed Nov. 28, 2008", 16 pgs.

"U.S. Appl. No. 11/262,343, Response filed Jan. 30, 2009 to Non-Final Office Action mailed Nov. 28, 2008", 13 pgs.

"U.S. Appl. No. 11/262,343, Response filed Jun. 15, 2009 to Final Office Action mailed Apr. 27, 2009", 12 pgs.

"U.S. Appl. No. 11/262,442, Non-Final Office Action mailed Jan. 7, 2009", 16 pgs.

"U.S. Appl. No. 11/262,442, Non-Final Office Action mailed Aug. 31, 2009", 18 pgs.

"U.S. Appl. No. 11/262,442, Response filed Apr. 27, 2009 to Non Final Office Action mailed Jan. 7, 2009", 17 pgs.

"U.S. Appl. No. 11/262,543, Advisory Action mailed Jul. 1, 2009", 3 pgs.

"U.S. Appl. No. 11/262,543, Final Office Action mailed Apr. 27, 2009", 13 pgs.

"U.S. Appl. No. 11/262,543, Non-Final Office Action mailed Dec. 30, 2008", 11 pgs.

"U.S. Appl. No. 11/262,543, Notice of Allowance mailed Sep. 15, 2009", 10 Pgs.

"U.S. Appl. No. 11/262,543, Pre-Appeal Brief Request mailed Jul. 20, 2009", 5 pgs.

"U.S. Appl. No. 11/262,543, Response filed Mar. 9, 2009 to Non-Final Office Action mailed Dec. 30, 2008", 14 pgs.

"U.S. Appl. No. 11/262,543, Response filed Jun. 15, 2009 to Final Office Action mailed Apr. 27, 2009", 11 pgs.

IBM Corporation, "", *Tivoli software distribution users guide 4.1*, (636 pages) XP-002321301 Relevant pgs, as per Dr. Verhasselt—For matters 78EP04, 78EP05, 78EP06: pp. 251, 262, 407, 436, 439, 443. For matter 78EP07: pp. 5, 10, 11, 163, 176, 177; For matter 78EP10: pp. 1, 4, 12, 251, 252, 449, 450, 452, 577., (2001), 1, 4, 5, 10, 11, 12, 251, 252, 262, 407, 436, 439, 443, 449, 450, 452, 577.

IBM Corporation, "", *IBM Tivoli Configuration Manager—User's Guide for Software Distribution—Version 4.2*, XP-2325607, (Oct. 2002), 1-358.

McFarland Metzger, Sue S, "SAP R/3 change and transport management : the official SAP guide / (SAP R/3—Systemlandschaft Implementieren und warten)", XP-002325774, (Jan. 12, 2000), 419, 461, 465.

Schneider-Neureither, Andreas (ED), "SAP System Landscape Optimization", *SAP Press*, 2004, ISBN 1-59229-026-4, (2004), 73-78; 96-100.

Bawtree, Hugh , "A tool for managing change; Software Development", XP-002321302, (Aug. 2000),18 pgs.

Dabrowski, C , et al., "Understanding self healing in service discovery systems", XP-002323534, 6 pgs.

Hodgson, Alan , "Intel eBusiness Engineering Release Management and Application Landing", XP-002321303 *Intel Technology Journal, Q4*, (2000),1-9.

IBM Document Center, "Publication information", XP-2325608, (Observed Apr. 21, 2005),1 pg.

Szallies, Constantin , "On Using the Observer Design Pattern", XP-002323533, (Aug. 21, 1997),9 pgs.

"U.S. Appl. No. 11/261,816 Notice of Allowance mailed Jan. 12, 2010", 5 pgs.

"U.S. Appl. No. 11/262,143, Response filed Dec. 11, 2009 to Non Final Office Action mailed Oct. 8, 2009", 14 pgs.

"U.S. Appl. No. 11/262,343, Response filed Dec. 4, 2009 to Non Final Office Action mailed Sep. 14, 2009", 12 pgs.

"U.S. Appl. No. 11/262,442, Response filed Nov. 18, 2009 to Non Final Office Action mailed Aug. 31, 2009", 13 pgs.

"U.S. Appl. No. 11/262,543, Notice of Allowance mailed Jan. 7, 2010", 5 pgs.

"U.S. Appl. No. 11/262,143, Final Office Action mailed Mar. 25, 2010", 14 pgs.

"U.S. Appl. No. 11/262,143, Pre-Appeal Brief Request filed May 11, 2010", 5 pgs.

"U.S. Appl. No. 11/262,326, Non-Final Office Action mailed Apr. 26, 2010", 13 pgs.

"U.S. Appl. No. 11/262,343, Examiner Interview Summary mailed Nov. 9, 2009", 3 pgs.

"U.S. Appl. No. 11/262,343, Final Office Action mailed Mar. 9, 2010", 16 pgs.

"U.S. Appl. No. 11/262,343, Pre-Appeal Brief Request filed Apr. 15, 2010", 5 pgs.

"U.S. Appl. No. 11/262,442, Final Office Action mailed Apr. 19, 2010", 8 pgs.

"U.S. Appl. No. 11/262,326, Response filed Jul. 26, 2010 to Non Final Office Action mailed Apr. 26, 2010", 13 pgs.

"U.S. Appl. No. 11/262,343, Appeal Brief filed Jun. 22, 2010", 26 pgs.

"U.S. Appl. No. 11/262,343, Decision on Pre-Appeal Brief mailed Jun. 3, 2010", 2 pgs.

"U.S. Appl. No. 11/262,442, Response filed Jun. 9, 2010 to Final Office Action mailed Apr. 19, 2010", 16 pgs.

* cited by examiner

METHOD FOR EFFECTING A PRELIMINARY SOFTWARE SERVICE IN A PRODUCTIVE SYSTEM OF A SOFTWARE SYSTEM LANDSCAPE AND COMPUTER SYSTEM

CLAIM OF PRIORITY

The present patent application claims the priority benefit of the filing date of European Application (EPO) No. 04 025 507.7 filed Oct. 27, 2004, which is incorporated herein by reference.

TECHNICAL FIELD

This application relates generally to servicing of a software system landscape, and more particularly to a method for effecting a preliminary software service in a productive system of a software system landscape and to a computer system.

BACKGROUND

Complex software like applicant's SAP R/3 Release 4.5 (SAP) requires customization, e.g. selection of predefined functionality, and adaptation, e.g. addition of or amendment to functionality, as well as other servicing like program and data updates, cf. "SAP System Landscape Optimization" by A. Schneider-Neureither (Ed.), SAP Press, 2004, ISBN 1-59229-026-4, and "SAP R/3 Änderungs-und Transportmanagement" by Metzger and Röhrs, Galileo Press GmbH, Bonn, Germany, $4^{th}$ reprint 2004, ISBN 3-934358-42-X.

Before such servicing may be performed, however, it has to be assured that the customizations, adaptations, program and data updates etc. are free of errors and integrate flawlessly into the software and data environment. In a factory for instance servicing errors are bound to result in costly workflow disruptions due to software malfunction or data corruption. Apart from the servicing side, other use of the software like training of new or inexperienced users may also result in a disruption of the productive system.

Such complex software may therefore be implemented in form of separate logical systems that together form a system landscape. A typical implementation of the aforementioned SAP software for instance may, cf. FIG. 1, comprise a development system 101 for customizing and development work, a quality assurance system 102 for testing functionality using representative test data, a training system 103 for training new users, and several productive systems 104, e.g. each for a different factory, for actual productive use. Other or additional users and systems may be defined according to the particular requirements.

Figure 1:
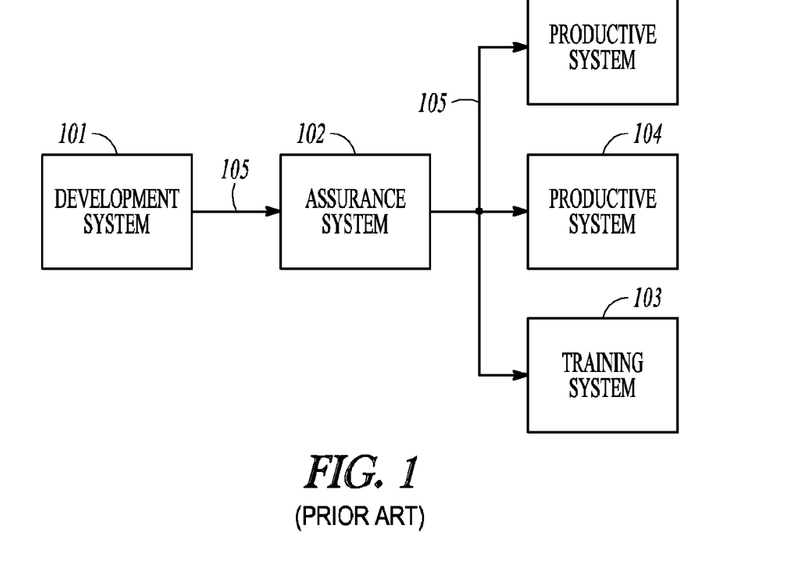
FIG. 1 shows a system landscape of the prior art.

The logical systems are identical in large parts, function autonomously and may be run on a single computer. The quality assurance system 102 for example resembles the productive system 104 in that it provides all the functionality, its present data and additionally special test data. New customization settings or adaptations may thus be thoroughly tested in the quality assurance system 102 without jeopardizing the productive system 104. Likewise, the training system 103 resembles the productive system 104 in that it provides some of the functionality and special test data. A new user using the training system 103 may thus become accustomed to the functionality and observe the effect of his actions, albeit without disturbing the productive system 104.

A transport management system connects the logical systems and serves to forward software services between systems of the system landscape via logical transport paths 105.

A service may for example be approved in the development system 101 for export. It will then be forwarded to an input buffer of the quality assurance system 102. Import into the quality assurance system 102 is approved or denied manually by an operator. Thereafter, the software service is forwarded to the quality assurance system 102, and then to the training system 103 and the productive systems 104 where it will be imported following manual approval by an operator.

The operator is in charge of manually effecting the servicing. This requires an analysis of the system landscape layout, of the route that each service takes through the system landscape, project status switches in each system that define the respective system's changeability options, attributes in each service that define properties of the service etc. Import of services and other tasks are performed based on this analysis.

This process is time consuming and bears the risk of errors, in particular in cases that are not part of the routine servicing. In case of a malfunction of a productive system for instance a hot fix or program patch, here referred to as preliminary software service, needs to be implemented quickly. In such a case, only rudimentary testing of the preliminary software service in the development system may be regarded sufficient, so that the preliminary software service need not be imported into all systems but may be routed from the development system straight to the malfunctioning productive system. The operator then needs to analyze the system landscape, decide which systems to log into, which settings of which systems to change, etc.

Figure 2:
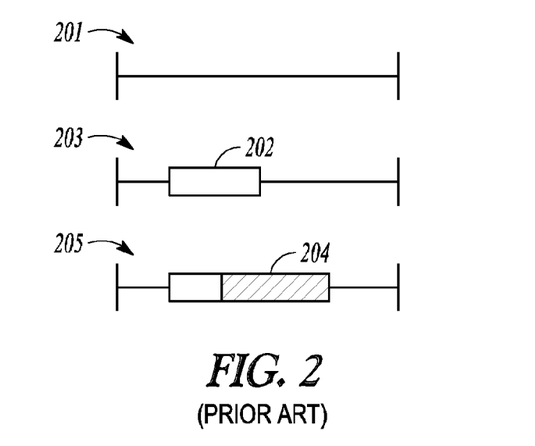
FIG. 2 illustrates a preliminary and a regular software service according to the prior art.

Additionally, the preliminary software service needs to be transported through all systems in the next regular servicing. Otherwise it may become overwritten during the next regular service as illustrated by FIG. 2. An original version 201 of the software and data of the malfunctioning productive system 104 is first modified by a hot fix 202, resulting in modified version 203, and subsequently during regular servicing by a software service 204, resulting in modified version 205 with the hot fix 202 partially overwritten. The hot fix 203 therefore needs to be imported again after the regular service.

In view of the fact that an SAP R/3 implementation may comprise dozens of systems and require thousands of services per month during phases of change, the operator time required becomes considerable as does the risk for errors to occur.

SUMMARY

In one aspect of the invention, a method is provided for effecting a preliminary software service in at least one productive system of a plurality of logical systems of a software system landscape, wherein the logical systems are interconnected by logical transport paths and each logical system has associated therewith one of a plurality of system roles, the method comprising the steps of: providing system role types, each system role being associated to one of the system role types; providing an association of tasks to system role types; providing a transport track that defines a route for software services through logical systems in a particular order and specifies one source system in which software services are permitted, adjacent interconnected systems, and at least one target system; providing a preliminary software service relating to at least one of the code and the data of at least one productive system; and generating a hot fix instance from the preliminary software service, the system role types, the association and the transport tracks, the hot fix instance defining tasks for routing the preliminary software service to at least one productive system and for executing the preliminary software service therein.

In a further aspect, a computer system is provided comprising a plurality of logical systems comprising at least one productive system, each logical system having associated therewith one of a plurality of system roles; logical transport paths that interconnect the logical systems to form a software system landscape; a transport track that defines a route for software services through systems in a particular order and specifies one source system in which software services are permitted, adjacent interconnected systems, and at least one target system, each software service relating to at least one of the code and the data of a system in the landscape; system role types, each system role being of a system role type; an association of tasks to system role types; a preliminary software service for at least one productive system; and a hot fix instance generated from a preliminary software service, the system role types, the association and the transport tracks, the hot fix instance defining tasks for routing the preliminary software service to at least one productive system and for executing it therein.

In a still further aspect, a computer program product is provided, the computer program product comprising on a storage medium a computer code that upon execution on a computer system performs the method according to the invention.

Example embodiments of the invention thus provide for an automated generation of a hot fix instance with all tasks that are required for effecting a preliminary software service. The complexity is considerably reduced as the operator merely needs to approve automatically generated tasks.

BRIEF DESCRIPTION OF THE DRAWINGS

Further embodiments of the invention are inferable from the following description and the claims.

DETAILED DESCRIPTION

Figure 3:
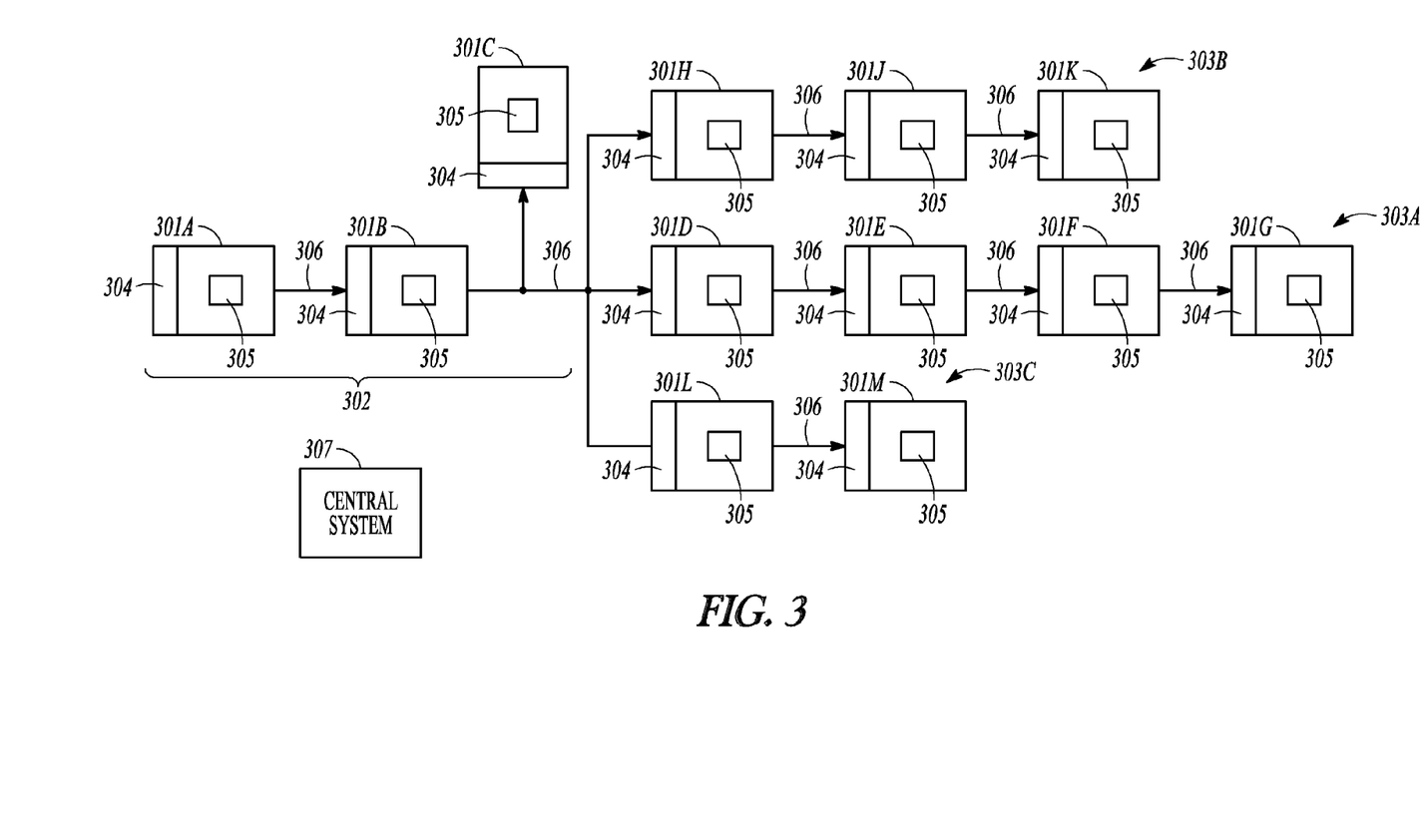
FIG. 3 illustrates a system landscape according to an example embodiment of the invention.

The embodiment shown in FIG. 3 illustrates an SAP R/3 Release 4.5 system landscape 300 with separate logical systems 301 that are here divided into a global part 302, e.g. at a main development and production facility, and local parts 303a, 303b, 303c, e.g. at other production facilities.

The global part 302 may comprise at least a development system 301a for customizing and development work, a quality assurance system 301b for testing functionality using representative test data, and a productive system 301c for actual productive use.

The local part 303a comprises a development system 301d for customizing and development work of local adaptations to SAP, e.g. to meet different legal requirements if part 303a is located in a different country than the global part 302

The local part 303a further comprises a quality assurance system 301e for testing functionality using representative test data, a training system 301f for training new users, and a productive system 301g for actual productive use.

The local part 303b comprises a development system 301h, a quality assurance system 301j and a productive system 301k, but no training system. The local part 303c is a two system landscape comprising a development system 301l and a productive system 301m only.

The system landscape may be different according to the actual requirements. Fewer or more, different or differently connected or grouped systems 301 may be defined as needed.

The logical systems 301 are identical in large parts and function autonomously. The quality assurance system 301j for example resembles the productive system 301k in that it provides all the functionality, its present data and additionally special test data. New customization settings or adaptations may thus be thoroughly tested in the quality assurance system 301j without jeopardizing the productive system 301k.

Each system 301 comprises an import buffer 304 for buffering incoming software services and means 305 for communication with a central system 307. A transport management system connects the logical systems 301 and serves to route software services across the system landscape via logical directional transport paths 306. A service may for example relate to customization of a system 301, e.g. a selection of predefined functionality in the system 301, or an adaptation of a system 301, e.g. an addition of or amendment to functionality, or to program and data updates or hot fixes or patches the like. Transport tracks are provided that each define one or more particular routes for software services along the transport paths through the system landscape. A transport track may for example define the route from system 301a through systems 301b, 301h, 301j to system 301k. Another transport track may define the route from system 301d through systems 301e, 301f to system 301g. Transport tracks with branches may also be provided, e.g. from system 301a to system 301b and then in a first branch to system 301c and in a second branch to systems 301l, 301m. There may be more than one transport track per system landscape, each transport track being assigned to a project context like a development project for the local part 303a only or a documentation project for the global part 302 only etc.

The systems 301 of each part 302, 303a, 303b, 303c and the central system 307 may be located and simultaneously executed in a single computer, but may be distributed across separate hardware. The global part 302 and the local parts 303a, 303b, 303c each run on physically separate computer systems, which themselves may comprise different computers.

Figure 4:
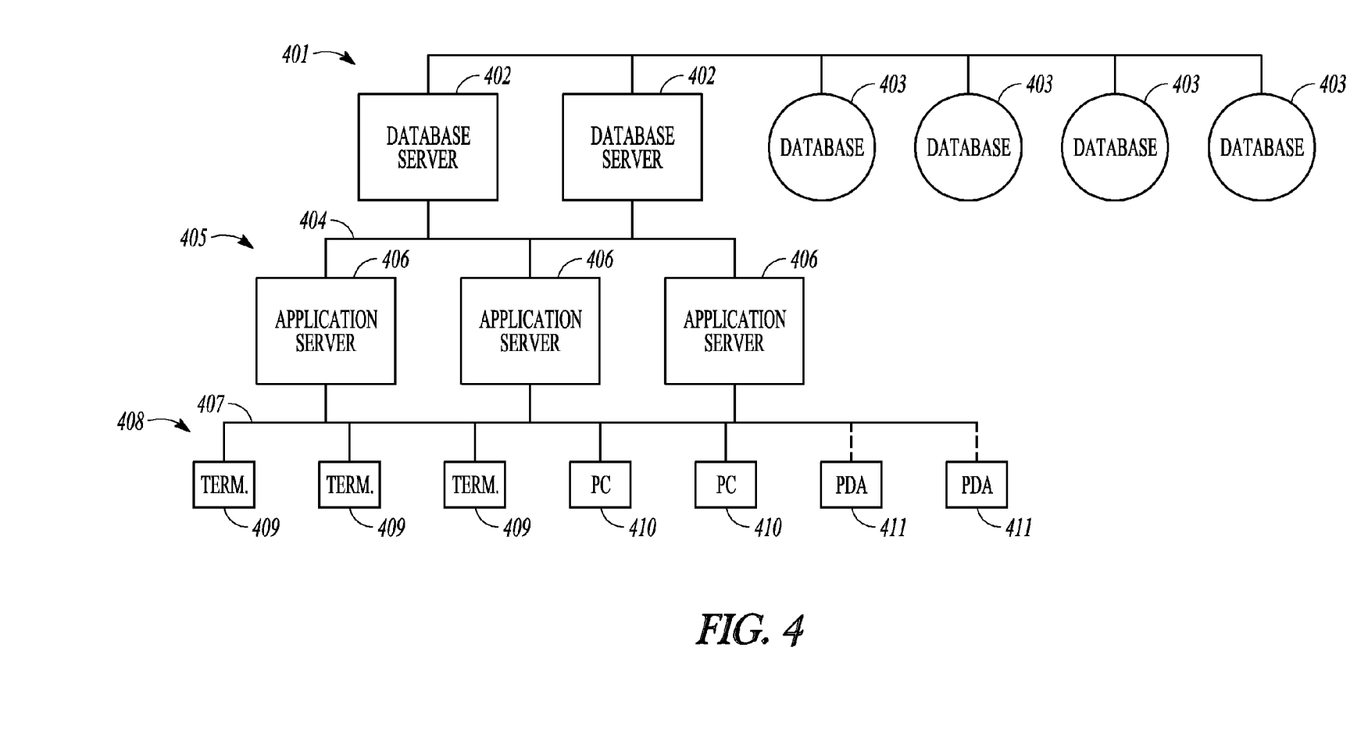
FIG. 4 shows an example embodiment of the hardware of a computer system according to an example embodiment of the invention.

An example implementation of the local part 303a may comprise, cf. FIG. 4, a data base layer 401 for storing and retrieving business data like a factory inventory, employee data, sales figures etc. The data base layer 401 comprises one or more data base servers 402 and four data bases 403, one for each of the systems 301d, 301e, 301f and 301g.

Connected to the data base layer 401 by a suitable network 404, e.g. a LAN, is an application layer 405 for execution of the software of the systems 301d, 301e, 301f and 301g. The application layer 405 comprises one or more application servers 406.

Finally, connected to the application layer 405 by a suitable network 407, e.g. a LAN, is a presentation layer 408 for the graphical user interface (GUI). The presentation layer 408 comprises dumb terminals 409, Personal Computers 410 and/or wireless access devices 411 like PDAs.

Each system 301 has associated therewith a system role which defines the respective system's function within the landscape. The system 301a, 301b and 301c for example, have the roles "development system in the global part", "quality assurance system in the global part" and "productive system in the global part", respectively. The systems 301*l* and 301*m* have the roles "development system in the local part 303*c*" and "productive system in the local part 303*c*", respectively. The other systems 301 have corresponding roles. In SAP, the system roles are typically defined in the Solution Manager for Implementation.

According to an example embodiment, system role types are provided. System role types may comprise the following:

D Source systems: A transport request comprising a preliminary software service is generated and sometimes rudimentary tested in a system of this type, usually a development system.

O Follow-on system: A transport request comprising a preliminary software service is not imported into a system of this type but instead forwarded to at least one next system of the transport track.

P Target system: A transport request comprising a preliminary software service is imported into a system of this type but not forwarded. Target systems are typically productive systems.

In the embodiment of FIG. 3 the development systems 301*a*, 301*h*, 301*d* and 301*l* are of system role type D, the productive systems 301*c*, 301*k*, 301*g* and 301*m* are of system role type P and the systems 301*b*, 301*j*, 301*e* and 301*f* between the development systems and the productive systems are of the system role type O. Other and/or additional system types may be provided.

Figure 5:
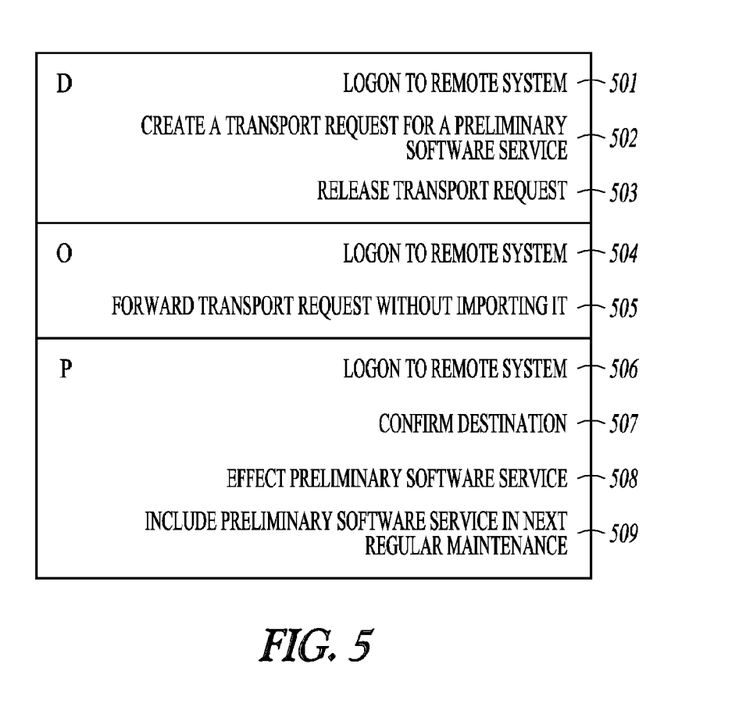
FIG. 5 illustrates a list of tasks associated to system role types.

Tasks are assigned to system role types. The tasks may be marked as compulsory and may comprise the following:

for type D:
generate transport request with preliminary software service
test preliminary software service
release transport request for forwarding to one or more productive systems for type O:
forward transport request without importing it for type P:
import transport request, notify quality management and await release
amend next regular maintenance service to include the imported preliminary software service In the example of FIG. 5 a list 500 contains for the system role type D a task 501 to logon to a remote system, a task 502 to create a transport request for a preliminary software service, and a task 503 to release the transport request to the system landscape for forwarding to at least one productive system. For the system role type O the list 500 comprises a task 504 to logon to a remote system and a task 505 to forward transport request without importing it. For the system role type P the list 500 comprises a task 506 to logon to a productive system, a task 507 to confirm that the particular productive system is the destination for the preliminary software service, a task 508 to effect the preliminary software service and a task 509 to amend a next regular maintenance service to include the imported preliminary software service. Other and/or additional tasks as well as attributes like "compulsory" may be provided. For example, a task to first import software services that are already queued in the import buffer but would only be imported during the next regular service, a task to check certain system properties, a task to check the interdependencies of software services in the buffer and to reorder them to avoid mutual overwriting, etc.

Based on the destination(s) of the preliminary software service, the transport tracks, the system role types and the list 500, a hot fix instance is automatically generated in the central system 307. The hot fix instance contains all tasks that are required to effect the preliminary software service in the destination productive system(s). The tasks of a hot fix instance may be displayed, executed, managed, analyzed and documented from the central system 307 by suitable software, e.g. SAP's Schedule Manager. For that purpose, the tasks may provide spool lists, statuses, application logs, job logs etc. to the central system 307 or generate that information in the central system 307.

The hot fix instance may have a hierarchical structure. The top level contains one entry per transport track. The next level contains one entry per system role type, even in case that no system of corresponding type is defined. The next level contains one entry per system role only if this role is used by a system. The lowest level contains the tasks for each system.

Figure 6:
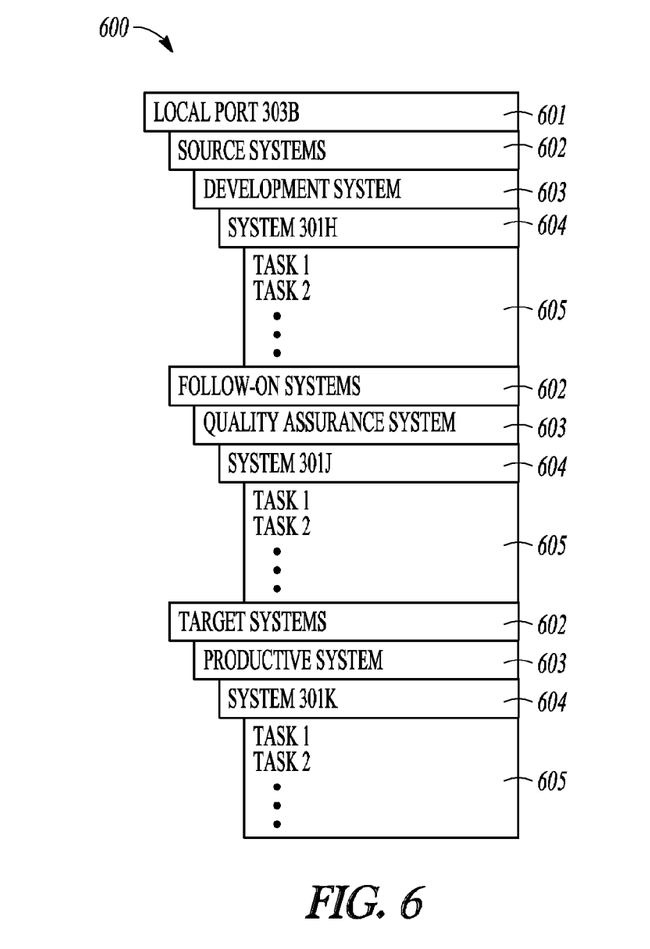
FIG. 6 illustrates a hot fix instance.

An example hot fix instance 600 is illustrated in FIG. 6 and has here a structure that is hierarchically grouped according to transport track 601, system role types 602, system roles 603, systems 604 and finally tasks 605. The tasks are associated to particular systems. The grouping allows to block and unblock groups of tasks.

According to an example embodiment of a method of the invention, system roles and system role types are provided, the systems of the system landscape are associated to the system roles and a list of tasks is associated to system role types. At least one transport track is provided that defines a route for transport requests through systems in a particular order and specifies one source system in which software services are permitted, adjacent interconnected systems, and at least one end or target system. A hot fix instance is generated from the system role types, the list and the transport tracks, and defines tasks for effecting a preliminary software service outside a regular service. This involves analyzing the transport tracks to identify the systems that need to be passed, analyzing them to identify their system roles, analyzing the system roles to identify their type, and compiling tasks for the affected systems according to the list. The tasks of the hot fix instance are then performed and may require authorization by the operator. The operator does not need to consider the system landscape and the transport tracks and other information to compile the tasks, but merely has to authorize steps of the hot fix instance. Tasks of one level may only be executed once the tasks of the superior levels are released.

Although the foregoing has been a description of an example embodiment of the invention, it will be apparent to those skilled in the art upon review of this disclosure that numerous variations and modifications may be made in an embodiment of the invention. For example, instead of using SAP R/3 Release 4.5, other SAP and non-SAP systems may benefit from the invention.

What is claimed is:

1. A method to effect a software service in at least one productive system of a plurality of logical systems of a software system landscape, the plurality of logical systems being interconnected by logical transport paths and each of the plurality of logical systems having associated therewith one of a plurality of system roles, the method comprising:

providing, using one or more processors, system role types, each system role being associated to one of the system role types, low-level operational tasks being assigned to the system role types, the system role types including source systems, follow-on systems, and target systems, the follow-on systems including at least one of a training system, a testing system, and a quality assurance system;

providing a transport track that defines a route for software services, the route being subsequently through the plurality of logical systems and specifying one source system in which software services are permitted, adjacent interconnected systems, and at least one of the target systems;

providing software services between systems of the landscape by forwarding the software service into an input buffer of a system, importing the software service into the system, forwarding the software service into the import buffer of the next system;

providing a preliminary software service for fixing a malfunctioning system relating to at least one of the code and the data of at least one productive system;

providing an association of tasks to system role types; and generating automatically a hot fix instance from the preliminary software service, the system role types, the association and the transport tracks, the hot fix instance defining tasks for routing the preliminary software service to at least one productive system and for executing the preliminary software service therein.

2. The method of claim 1, wherein the hot fix instance is generated with hierarchy levels.

3. The method of claim 2, wherein the hierarchy levels are generated to include a transport track level, a system role type level below the transport track level, a system role level below the system role type level, a system level below the system role level and a task level below the system level.

4. The method of claim 1, wherein a task to include the preliminary software service in the next regular software service is added to the tasks.

5. The method of claim 1, wherein the tasks in the respective system are executed from a central server.

6. A computer system comprising:

a plurality of logical systems having one or more processors and comprising at least one productive system, each of the plurality of logical systems having associated therewith one of a plurality of system roles;

logical transport paths that interconnect the plurality of logical systems to form a software system landscape;

a transport track that defines a route for software services through systems in a particular order and specifies one source system in which software services are permitted, adjacent interconnected systems, and at least one target system, each software service relating to at least one of the code and the data of a system in the landscape;

system role types, each of the plurality of system roles being of a system role type, low-level operational tasks being assigned to the system role types, the system role types including source systems, follow-on systems, and target systems, the follow-on systems including at least one of a training system, a testing system, and a quality assurance system;

an association of tasks to system role types;

a preliminary software service for the at least one productive system; and a hot fix instance configured to be generated from a preliminary software service, the system role types, the association and the transport tracks, the hot fix instance to define tasks to route the preliminary software service to at least one productive system and to execute it therein.

7. The system of claim 6, wherein the hot fix instance comprises hierarchy levels.

8. The system of claim 7, wherein the hierarchy levels include a transport track level, a system role type level below the transport track level, a system role level below the system role type level, a system level below the system role level and a task level below the system level.

9. The system of claim 8, wherein the system role types comprise one of the group of source system, follow-on system or target system.

10. The system of claim 6, wherein the tasks in the respective system are executable from a central server.

11. A computer program product comprising on a storage medium a computer code that upon execution on a computer system performs a method to effect a software service in at least one productive system of a plurality of logical systems of a software system landscape, wherein the logical systems being interconnected by logical transport paths and each logical system has associated therewith one of a plurality of system roles, the method comprising:

providing, using one or more processors, system role types, each system role being associated to one of the system role types, low-level operational tasks being assigned to the system role types, the system role types including source systems, follow-on systems, and target systems, the follow-on systems including at least one of a training system, a testing system, and a quality assurance system;

providing a transport track that defines a route for software services, the route being subsequently through logical systems and specifying one source system in which software services are permitted, adjacent interconnected systems, and at least one of the target systems;

providing software services between systems of the landscape by forwarding the software service into an input buffer of a system, importing the software service into the system, forwarding the software service into the import buffer of the next system;

providing a preliminary software service for fixing a malfunctioning system relating to at least one of the code and the data of at least one productive system;

providing an association of tasks to system role types; and generating automatically a hot fix instance from the preliminary software service, the system role types, the association and the transport tracks, the hot fix instance defining tasks for routing the preliminary software service to at least one productive system and for executing the preliminary software service therein.

* * * * *